United States Patent
Albagli et al.

(10) Patent No.: US 7,019,304 B2
(45) Date of Patent: Mar. 28, 2006

(54) SOLID-STATE RADIATION IMAGER WITH BACK-SIDE IRRADIATION

(75) Inventors: Douglas Albagli, Clifton Park, NY (US); Joseph John Shiang, Niskayuna, NY (US); George Edward Possin, Schenectady, NY (US); William Andrew Hennessy, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 215 days.

(21) Appl. No.: 10/681,767

(22) Filed: Oct. 6, 2003

(65) Prior Publication Data

US 2005/0072931 A1    Apr. 7, 2005

(51) Int. Cl.
*G01T 1/24* (2006.01)
(52) U.S. Cl. ................................. 250/370.11
(58) Field of Classification Search ........... 250/370.06, 250/370.08, 370.09, 370.11; 378/98.3, 98.8
See application file for complete search history.

(56) References Cited

U.S. PATENT DOCUMENTS

| | | | |
|---|---|---|---|
| 5,083,031 A * | 1/1992 | Hoelsher et al. | 250/484.3 |
| 5,229,626 A * | 7/1993 | Ebitani et al. | 257/84 |
| 5,686,733 A * | 11/1997 | Fallone et al. | 250/591 |
| 6,031,234 A | 2/2000 | Albagli et al. | |
| 6,060,714 A * | 5/2000 | Zhong et al. | 250/370.09 |
| 6,171,643 B1 | 1/2001 | Polischuk et al. | 427/76 |
| 6,541,774 B1 * | 4/2003 | DeJule et al. | 250/370.11 |
| 6,784,433 B1 * | 8/2004 | Zur | 250/370.09 |
| 6,895,077 B1 * | 5/2005 | Karellas et al. | 378/98.3 |

FOREIGN PATENT DOCUMENTS

WO    03071307    8/2003

OTHER PUBLICATIONS

S. D. Theiss, et al, "Polysilicon Thin Film Transistors Fabricated at 100 Degrees on a Flexible Plastic Substrate", Electron Devices Meeting, 1998, IEEE, IEDM Technical Digest, pp. 257-260.

* cited by examiner

*Primary Examiner*—David Porta
*Assistant Examiner*—Faye Polyzos
(74) *Attorney, Agent, or Firm*—Fletcher Yoder

(57) ABSTRACT

A solid-state imager with back-side irradiation. The present invention provides a solid-state imager that includes a substantially radiation transparent substrate adapted to receive incident radiation. The radiation travels through the substrate and a pixelated array of photosensitive elements to a scintillator material, which absorbs the radiation. The pixelated array of photosensitive elements receives light photons and measures the amount of light generated by radiation interactions with the scintillator material. With this imager, there is less spreading and blurring and thus a better quality image. In another embodiment, there is a substantially transparent material disposed between the pixelated array of photosensitive elements and the scintillator material. The substantially transparent material absorbs and substantially blocks electrons from entering the active regions of the pixelated array of photosensitive elements. This enables the imager to perform for a longer period of time according to its specifications.

58 Claims, 5 Drawing Sheets

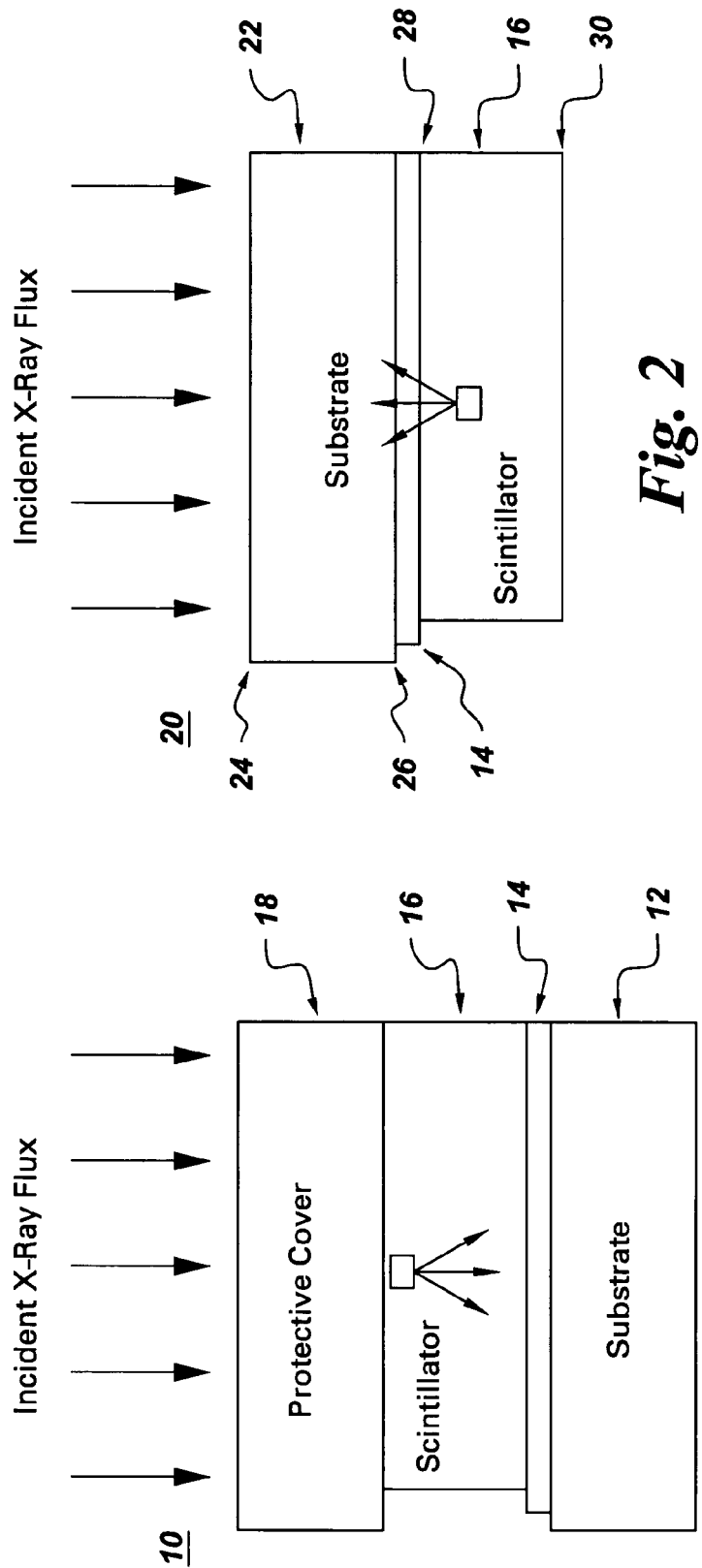

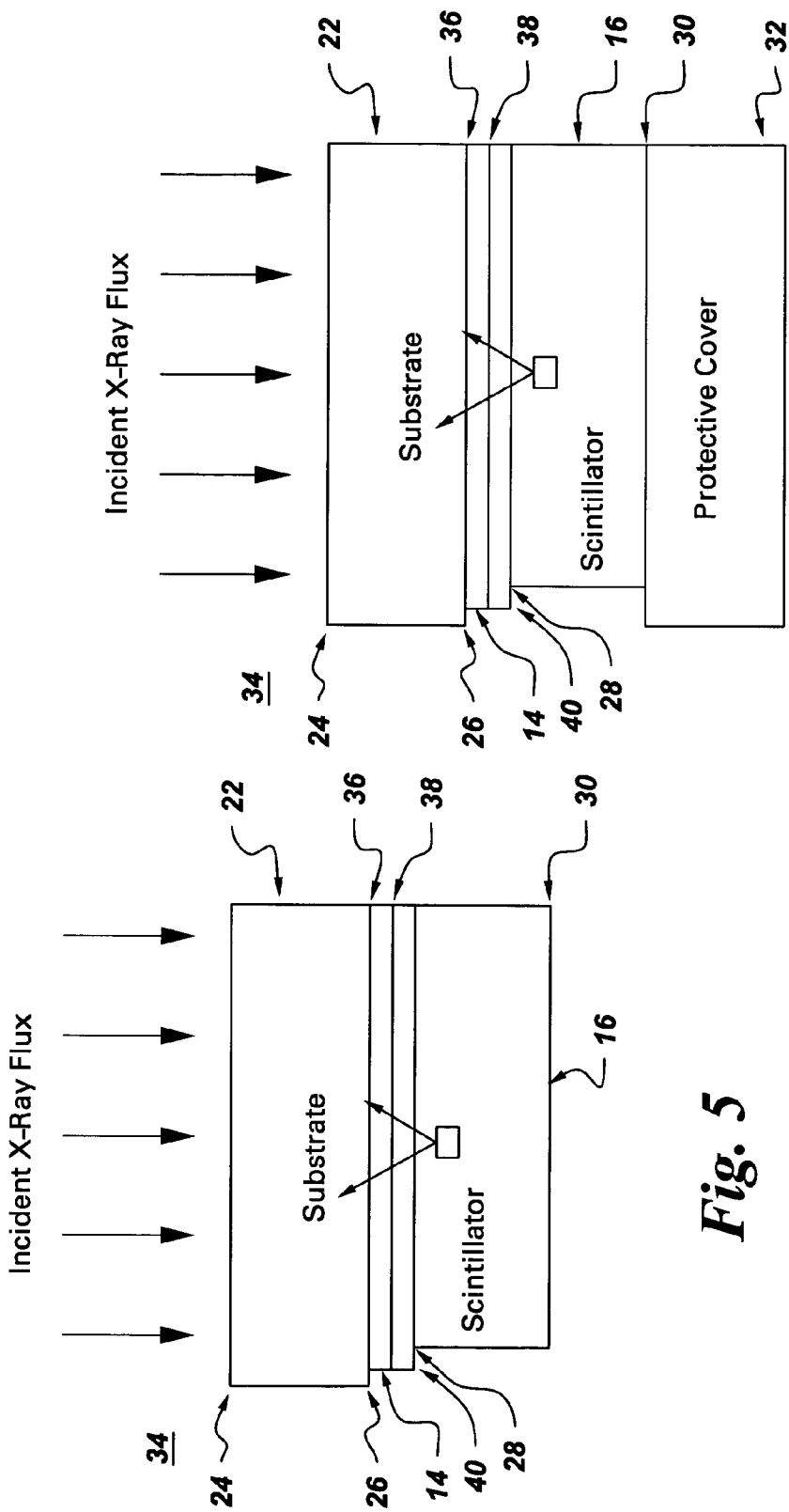

SOLID-STATE RADIATION IMAGER WITH BACK-SIDE IRRADIATION

BACKGROUND OF THE INVENTION

This invention relates generally to solid-state radiation imagers and more particularly to improving the spatial resolution of solid-state radiation imagers through back-side irradiation.

A typical solid-state radiation imager such as an x-ray imager uses a pixelated array of photosensitive elements fabricated on a substrate that is at least partially x-ray opaque. A scintillator coupled to the pixelated array of photosensitive elements receives incident x-rays. Some x-ray imagers have an x-ray transparent protective cover disposed over the scintillator to provide protection for the scintillator. In typical operation, incident x-rays pass through the protective cover into the scintillator. The scintillator absorbs the x-rays and generates light photons that emanate isotropically in all directions. The pixelated array of photosensitive elements receives the light photons that propagate through the scintillator. The pixelated array of photosensitive elements generates electrical signals that correspond to the energy level of the incident radiation. Image processing circuitry coupled to the x-ray imager processes the electrical signals to form an image.

The quality of an x-ray image typically depends on both the total number of x-rays absorbed by the imager and its spatial resolution or the extent of blurring that occurs. Generally, the efficiency of x-ray absorption improves as the thickness of the scintillator increases. Increasing the thickness of the scintillator results in better x-ray absorption and less wasted x-rays. A problem that arises as the thickness of the scintillator increases is that blurring of the image occurs. Blurring happens because most absorption of x-rays occurs at the top portion of the scintillator rather than the bottom portion, which increases the distance that the generated light photons have to propagate to reach the pixelated array of photosensitive elements. The distance is problematic because not all light photons will propagate to the pixelated array of photosensitive elements since the light emanates isotropically in all directions. The more distance that light has to travel to reach the pixelated array of photosensitive elements increases the likelihood of it spreading away from the array, which affects the energy level detected by the array and results in blurring. The blurring will improve as the thickness of the scintillator is reduced. Thus, current x-ray imagers must make a trade-off and select a scintillator thickness that balances x-ray absorption versus blurring.

One approach that has been used to address the trade-off of selecting a scintillator thickness that balances x-ray absorption versus blurring is to use a Cesium Iodide (CsI) scintillator material that has been vapor deposited into individual needles. The scintillator needles act as a light guide enabling the light photons to travel down the needles towards the pixelated array of photosensitive elements. Although the scintillator needles are helpful in directing the light photons towards the pixelated array of photosensitive elements, some spreading of the light still does occur, which results in blurring.

Therefore, there is a need for an x-ray imager that can provide improved image quality by addressing the trade-off of selecting a scintillator thickness that balances x-ray absorption versus blurring. In particular, it is desirable to have an x-ray imager that can have a thicker scintillator for improving x-ray absorption and dose efficiency, while maintaining the same blurring. Similarly, it is desirable to have an x-ray imager that can reduce blurring to increase the spatial resolution of images, while maintaining acceptable x-ray absorption levels.

BRIEF DESCRIPTION OF THE INVENTION

In one embodiment of the present invention there is a solid-state radiation imager. In this embodiment, the solid-state radiation imager comprises a substantially radiation transparent substrate having a first surface and a second surface opposite from the first surface. The first surface is adapted to receive incident radiation. The solid-state radiation imager also comprises a scintillator material having a first surface and a second surface opposite from the first surface. A pixelated array of photosensitive elements is disposed between the substantially radiation transparent substrate and the scintillator material. In particular, the pixelated array of photosensitive elements is disposed between the first surface of the scintillator material and the second surface of the substantially radiation transparent substrate.

In another embodiment, there is an x-ray imager that comprises a substantially x-ray transparent substrate having a first surface and a second surface opposite from the first surface, wherein the first surface is adapted to receive incident x-rays. The x-ray imager also comprises a scintillator material having a first surface and a second surface opposite from the first surface. The scintillator material is adapted to absorb the incident x-rays received by the substantially x-ray transparent substrate and generate light. A pixelated array of photosensitive elements is disposed between the substantially x-ray transparent substrate and the scintillator material. In particular, the pixelated array of photosensitive elements is disposed between the first surface of the scintillator material and the second surface of the substantially x-ray transparent substrate. The pixelated array of photosensitive elements is adapted to determine the amount of x-ray energy received by each pixel in the array.

In a third embodiment, there is a solid-state radiation imager that comprises a substantially radiation transparent substrate having a first surface and a second surface opposite from the first surface. The first surface is adapted to receive incident radiation. The solid-state radiation imager also comprises a scintillator material having a first surface and a second surface opposite from the first surface. A pixelated array of photosensitive elements is disposed between the substantially radiation transparent substrate and the scintillator material. In particular, the pixelated array of photosensitive elements is disposed between the first surface of the scintillator material and the second surface of the substantially radiation transparent substrate. The solid-state radiation imager also comprises a protective cover disposed on the second surface of the scintillator material.

In another embodiment, there is a solid-state radiation imager that comprises a substantially radiation transparent substrate having a first surface and a second surface opposite from the first surface. The first surface is adapted to receive incident radiation. The solid-state radiation imager also comprises a scintillator material having a first surface and a second surface opposite from the first surface. A pixelated array of photosensitive elements having a first surface and a second surface opposite from the first surface is disposed between the substantially radiation transparent substrate and the scintillator material. In particular, the first surface of the pixelated array of photosensitive elements is disposed on the second surface of the substantially radiation transparent substrate. The solid-state radiation imager also comprises a substantially transparent material disposed between the pixelated array of photosensitive elements and the scintillator material. In particular, the substantially transparent material is disposed between the first surface of the scintillator material and the second surface of the pixelated array of photosensitive elements.

In a fifth embodiment, there is an x-ray imager that comprises a substantially x-ray transparent substrate having a first surface and a second surface opposite from the first surface, wherein the first surface is adapted to receive incident x-rays. The x-ray imager also comprises a scintillator material having a first surface and a second surface opposite from the first surface. The scintillator material is adapted to absorb the incident x-rays received by the substantially x-ray transparent substrate and generate light. A pixelated array of photosensitive elements having a first surface and a second surface opposite from the first surface is disposed between the substantially x-ray transparent substrate and the scintillator material. In particular, the first surface of the pixelated array of photosensitive elements is disposed on the second surface of the substantially x-ray transparent substrate. The pixelated array of photosensitive elements is adapted to determine the amount of x-ray energy received by each pixel in the array. The x-ray imager also comprises a substantially transparent material disposed between the pixelated array of photosensitive elements and the scintillator material. In particular, the substantially transparent material is disposed between the first surface of the scintillator material and the second surface of the pixelated array of photosensitive elements. The substantially transparent material is adapted to shield the pixelated array of photosensitive elements from electrons generated in the scintillator material.

In yet another embodiment, there is a solid-state radiation imager that comprises a substantially radiation transparent substrate having a first surface and a second surface opposite from the first surface. The first surface is adapted to receive incident radiation. The solid-state radiation imager also comprises a scintillator material having a first surface and a second surface opposite from the first surface. A pixelated array of photosensitive elements having a first surface and a second surface opposite from the first surface is disposed between the substantially radiation transparent substrate and the scintillator material. In particular, the first surface of the pixelated array of photosensitive elements is disposed on the second surface of the substantially radiation transparent substrate. The solid-state radiation imager also comprises a substantially transparent material disposed between the pixelated array of photosensitive elements and the scintillator material. In particular, the substantially transparent material is disposed between the first surface of the scintillator material and the second surface of the pixelated array of photosensitive elements. The solid-state radiation imager also comprises a protective cover disposed on the second surface of the scintillator material.

BRIEF DESCRIPTION OF THE DRAWINGS

The brief description of the present invention will become better understood when the following detailed description is read with reference to the below mentioned drawings.

FIG. 1 is a schematic of a cross-sectional view of a solid-state radiation imager according to the prior art;

FIG. 2 is a schematic of a cross-sectional view of a solid-state radiation imager according to one embodiment of the invention;

FIG. 5 is a schematic of a cross-sectional view of a solid-state radiation imager according to a second embodiment of the invention;

FIG. 6 is an alternative embodiment of the solid-state radiation imager shown in FIG. 5.

DETAILED DESCRIPTION OF THE INVENTION

Figure 3:
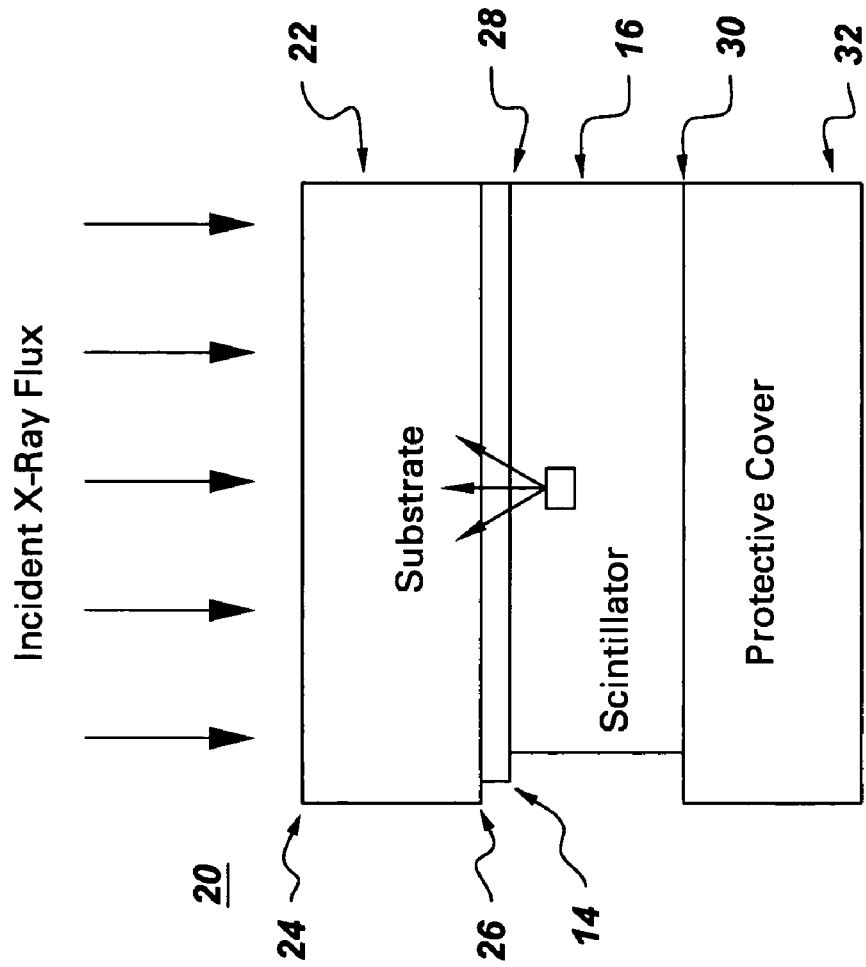
FIG. 3 is an alternative embodiment of the solid-state radiation imager shown in FIG. 2.

FIG. 1 is a schematic of a cross-sectional view of a solid-state radiation imager 10 such as an x-ray imager according to the prior art. The imager 10 comprises an x-ray opaque substrate 12. In large flat panel imagers (e.g., imagers greater than 10 cm×10 cm), the substrate 12 is typically comprised of glass. An example of an x-ray opaque substrate is a CORNING 1.1 mm 1737 substrate that has been doped with elements having a high atomic number (Z) such as Barium to provide special properties that can withstand stringent manufacturing specification required for semiconductor processing. This type of substrate has a very poor x-ray transmission. For example, the CORNING 1.1 mm 1737 substrate has an x-ray transmission that is less than 15% for a typical radiation spectrum used for mammography x-ray applications and less than 70% for a typical spectrum used for vascular x-ray applications.

The x-ray imager 10 also comprises a pixelated array of photosensitive elements 14 disposed on the x-ray opaque substrate 12. The pixelated array of photosensitive elements 14 is typically a one-dimensional array of pixels or a two-dimensional array of pixels arranged in rows and columns, however, the array can have any size and shape that is appropriate for desired type of imaging. Each pixel in the two-dimensional array has a photosensor such as a photodiode coupled via a switching transistor (e.g., a thin film field effect transistor) to two separate address lines, a scan line and a data line. In each row of pixels, each respective switching transistor is coupled to a common scan line through that transistor's gate electrode. In each column of pixels, the readout electrode of the transistor (e.g., the drain electrode of the transistor) is coupled to a data line.

FIG. 1 shows that the x-ray imager 10 also comprises a scintillator material 16 such as Cesium Iodide (CsI) disposed on the pixelated array of photosensitive elements 14. FIG. 1 shows the scintillator material 16 as a solid block, however, the material can take the form of individual needles separated from one another by a predetermined distance. The scintillator material 16 absorbs radiation such as an x-ray flux and generates light photons that propagate towards the pixelated array of photosensitive elements 14. Although FIG. 1 shows the light photons propagating in a downward direction towards the pixelated array of photosensitive elements 14, the light actually emanates isotropically in all directions.

The x-ray imager 10 also comprises an x-ray transparent protective cover 18 disposed on the scintillator material 16. The protective cover 18 is typically graphite or carbon fiber, however, other x-ray transparent materials such as aluminum, aluminum oxide, beryllium, quartz, or plastic are suitable for use as a cover. The purpose of the x-ray transparent protective cover 18 is to essentially protect the scintillator material 16. In particular, the x-ray transparent protective cover 18 keeps water and light out of the scintillator material 16, as well provides mechanical protection from physical damage.

During operation of the x-ray imager 10, an x-ray flux is pulsed on and the x-rays passing through the subject undergoing examination are incident on the protective cover 18. The scintillator material 16 absorbs the x-rays propagating through the protective cover 18 causing an interaction that results in the generation of the light photons. The light photons emanate isotropically in all directions although FIG. 1 shows the photons propagating in a downward direction. The pixelated array of photosensitive elements 14 receives the light photons that propagate through the scintillator material 16. The pixelated array of photosensitive elements 14 measure the amount of light generated by the x-ray interactions with the scintillator material 16. In particular, the pixel photodiodes absorb light and create a charge while their respective transistor switches are inactive. When the transistor switches and scan lines become conductive, the charge data are read out by sequentially enabling rows of pixels and reading the electrical signals from the respective pixels via the respective data lines. Image processing circuitry, which is coupled to the x-ray imager 10 then processes the electrical signals to form an image.

As mentioned above, a problem with a conventional x-ray imager like the one shown in FIG. 1 is that it is subject to blurring if one desires to increase the thickness of the scintillator to improve x-ray absorption and dose efficiency. In addition, the amount that one can reduce blurring to increase the spatial resolution of images while maintaining acceptable x-ray absorption levels is limited. Furthermore, one of ordinary skill in the art will recognize that increasing the x-ray dose to compensate for the absorption in the substrate is not generally acceptable. For medical imaging this increases the x-ray dose to the patient which is medically undesirable. Because of limited x-ray tube output, this would increase the exposure time. Longer exposure times are especially undesirable in medical imaging because of increased patient motion blurring and patient discomfort.

The solution of the present invention for this problem is to alter the composition of the substrate to make it substantially x-ray transparent and invert the x-ray imager so that incident x-rays pass through the substrate and the pixelated array of photosensitive elements before reaching the scintillator material. Incident x-rays passing through the substrate and the pixelated array of photosensitive elements before reaching the scintillator material is known as backside irradiation. This invention recognizes that having the incident x-rays pass through the pixelated array of photosensitive elements before reaching the scintillator material is not feasible by simply inverting the structure in FIG. 1, because of the limitations associated with the x-ray opaque substrate 12. In particular, the substrate needs to meet stringent specifications that include but are not limited to large temperature variations, semiconductor processing and etching. Typically, these substrates are doped with elements having high atomic numbers (Z) such as Barium to meet the stringent specifications. Since this type of substrate is x-ray opaque, (i.e., it absorbs x-rays), it is not suited for use to receive incident x-rays and pass them through to the pixelated array of photosensitive elements. Most likely, if the conventional substrate were implemented in the manner set forth for in this invention, it would end up absorbing about 60 percent of the x-rays for mammography applications and about 30 percent for vascular applications. The resulting image would have very poor image quality because too many x-rays are absorbed, which leaves an insufficient amount of information to produce a quality image.

By altering the composition of the substrate to make it substantially x-ray transparent and inverting the x-ray imager as disclosed in this invention, the majority of the x-ray interactions, which occur near the entry point of the scintillator material, are now substantially closer to the pixelated array of photosensitive elements. This results in significantly less blurring and allows one to obtain better image quality while operating at the same x-ray dose. Below are more details of this architecture and an explanation how it results in significantly less blurring and better image quality while operating at the same x-ray dose.

FIG. 2 shows a schematic of a cross-sectional view of a solid-state radiation imager according to one embodiment of the invention. The solid-state radiation imager in this embodiment and subsequent embodiments is described as an x-ray imager. A person of skill in the art will recognize that the scope and breadth of the teachings of the invention is not limited to an x-ray imager and may be suitable for other types of radiation imagers. In FIG. 2, the x-ray imager 20 comprises a substantially radiation or x-ray transparent substrate 22 having a first surface 24 and a second surface 26 opposite from the first surface, wherein the first surface is adapted to receive the incident radiation such as x-rays. In this invention, substantially x-ray transparent means having an x-ray transmission that is greater than about 80%. The x-ray imager 20 also comprises a scintillator material 16 having a first surface 28 and a second surface 30 opposite from the first surface. The x-ray imager 20 further comprises a pixelated array of photosensitive elements 14 disposed between the substantially x-ray transparent substrate 22 and the scintillator material 16, wherein the pixelated array of photosensitive elements is disposed between the first surface 28 of the scintillator material and the second surface 26 of the substantially x-ray transparent substrate.

As mentioned above, the substrate 22 is substantially x-ray transparent and inverted from the location shown in FIG. 1 so that incident x-rays pass through the substrate and the pixelated array of photosensitive elements 14 before reaching the scintillator material 16. In one embodiment, the substantially x-ray transparent substrate may comprise a glass material such as quartz, however, one of ordinary skill in the art will recognize that other glass material such as CORNING EAGLE is suitable for use as the substantially x-ray transparent substrate 22. Glass material such as quartz has an x-ray transmission that is greater than about 80 percent, wherein a preferred range is between about 85 percent to about 95 percent. A glass material that can attain an x-ray transmission that is greater than 80 percent typically needs a low atomic number (Z). In the present invention, the glass material has an atomic number (Z) that is less than or equal to 14 for at least 85 percent or more of its composition. Since x-ray transmission depends on thickness, density and the atomic number (Z) of the material, one of ordinary skill in the art will recognize that the glass material may have a thickness that ranges from about 200 microns to about 700 microns in order to attain the desired transparency. A glass material in this thickness range can be attained by using a thin, flexible glass or by polishing and lapping down a conventional glass substrate with a thickness of around 1100 microns. For additional structural strength, one may laminate the glass material to a high temperature polymer Glass material is preferable as the substrate, but other materials that can withstand stringent semiconductor processing conditions are suitable for use as the substantially x-ray transparent substrate 22. For example, the substantially x-ray transparent substrate 22 can comprise a polymer material. In particular, the polymer can comprise polyethylene terepthalate, polyimide, polyether sulfone, polycarbonate and polyetherimide. This list of possible polymers is not exhaustive of the types of polymers that are suited for use as the substantially x-ray transparent substrate 22. Polymer materials are well suited as the substantially x-ray transparent substrate 22, especially for mammography and vascular x-ray applications because they have an atomic number (Z) that ranges from about 6 to about 7. With an atomic number (Z) in this range, one of ordinary skill in the art will recognize that the polymer material can have a thickness that ranges from about 500 microns to about 5000 microns because it has a lower density that is near 1. Another material that one can use as the substantially x-ray transparent substrate 22 is aluminum oxide ($Al_2O_3$). Aluminum oxide is well suited to perform as the substantially x-ray transparent substrate 22 because it has a low atomic number (Z) (i.e., Aluminum has a Z of 13 and Oxygen has a Z of 8). With an atomic number (Z) in this range, one of ordinary skill in the art will recognize that the aluminum oxide material can have a thickness that ranges from about 200 microns to about 2000 microns because it has a density that ranges between 2 and 3.

FIG. 3 is an alternative embodiment of the x-ray imager 20 shown in FIG. 2. In particular, FIG. 3 shows the x-ray imager 20 with a protective cover 32 disposed on the second surface 30 of the scintillator material 16. Unlike the protective cover 18 in FIG. 1, the protective cover 32 is a radiation or x-ray opaque material having a high atomic number (Z) (e.g., Z>25) to provide high x-ray absorption. In this invention, the x-ray opaque protective cover 32 can comprise Tungsten or Tantalum. The primary purpose of the protective cover 32 is to serve as a radiation shield for the imager electronics, which are typically mounted directly behind the x-ray imager. In addition, the protective cover 32 protects the scintillator from water, light and physical damage.

During operation of the x-ray imager 20, shown in FIGS. 2 and 3 an x-ray flux is pulsed on and the x-rays passing through the subject undergoing examination are incident on the substantially x-ray transparent substrate 22. The x-rays travel through the substrate 22 and the pixelated array of photosensitive elements 14 to the scintillator material 16, which absorbs the x-rays. As mentioned above, most of the absorption occurs at the top portion of the scintillator 16. As the x-rays absorb into the scintillator material 16, a cloud of electrons are generated, which interact further with the scintillator to produce light photons. Although FIGS. 2 and 3 show the photons propagating in an upward direction towards the pixelated array of photosensitive elements 14, the photons emanate isotropically in all directions. The pixelated array of photosensitive elements 14 receives the light photons and measure the amount of light generated by the x-ray interactions with the scintillator material 16 in the same manner described with reference to the imager in FIG. 1. Since. the majority of the absorption and interaction occurs at the top portion of the scintillator material 16, which is close to the entrance plane with the pixelated array of photosensitive elements 14, the light will have less distance to travel to reach the pixels. This results in less spreading of light and blurring and thus a better quality image than one would obtain with a conventional imager. If one desired to increase the thickness of the scintillator material as is sometimes needed for high energy x-ray applications, this would not affect the quality of the image because the distance that the light has to travel to reach the entrance with the pixelated array of photosensitive elements 14 remains the same for most of the x-rays.

Figure 4:
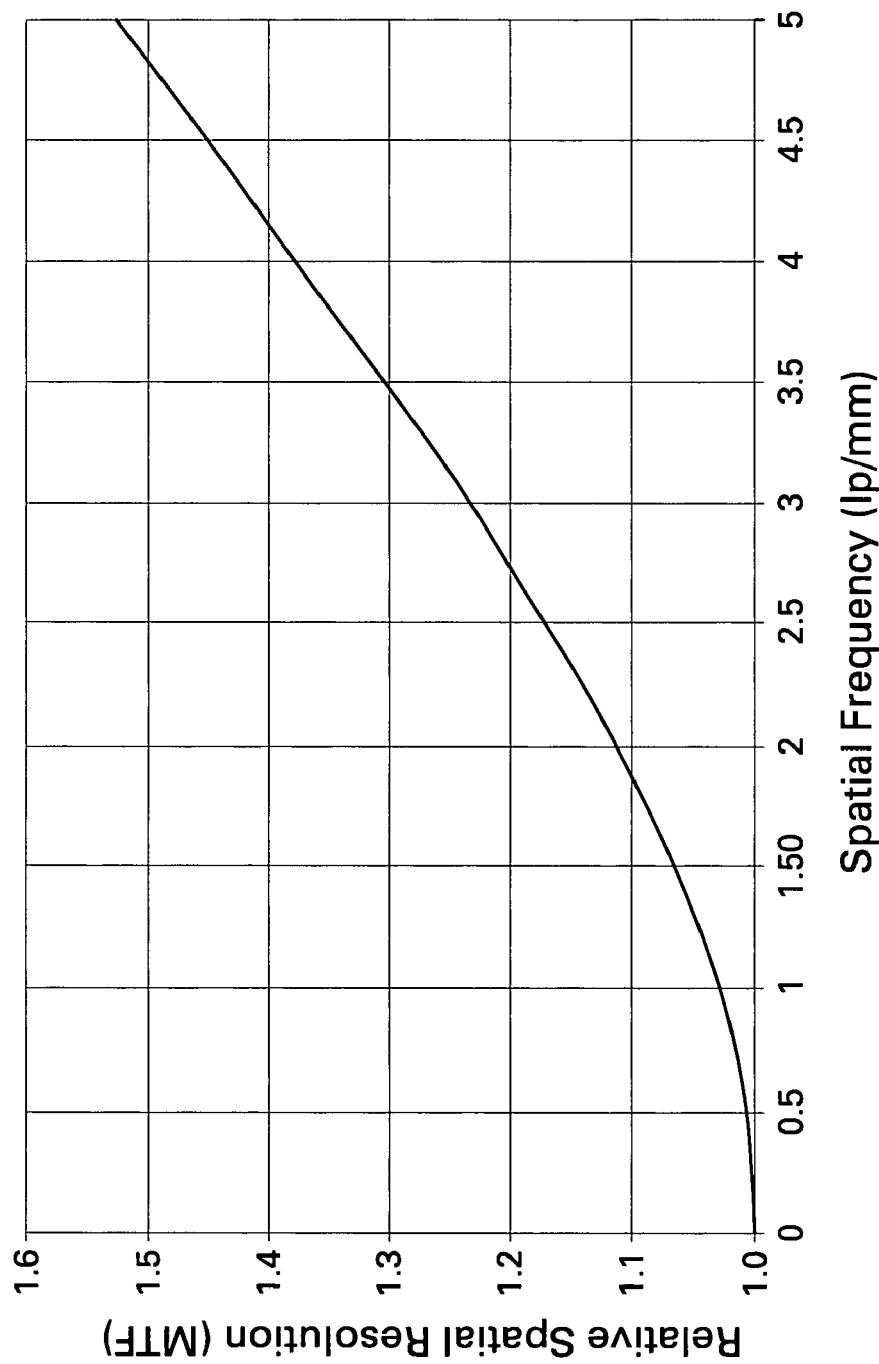
FIG. 4 is an illustration showing the expected improvement in spatial resolution with the imagers shown in FIGS. 2 and 3.

FIG. 4 is an illustration showing the expected improvement in spatial resolution with the x-ray imagers 20 shown in FIGS. 2 and 3. In particular, FIG. 4 shows the relative spatial resolution between the conventional imager shown in FIG. 1 and the imagers of the present invention shown in FIGS. 2 and 3. The relative spatial resolution between the conventional imager and the imager 20 of the present invention is shown in FIG. 4 through modulation transfer function (MTF), which is indicative of the amount of blurring. FIG. 4 shows that the relative modulation transfer increases between the conventional imager and the imager 20 of the present invention as the spatial frequency increases. In particular, the illustration shows an expected improvement of one and a half times for the imager of the present invention. The model that was used to generate this illustration assumes a 100 micron pixelated array and a Cesium Iodide scintillator having a thickness of 200 micron.

A potential drawback to having incident x-rays pass through the substrate and the pixelated array of photosensitive elements before reaching the scintillator material is that radiation damage may occur at the pixelated array. Typically, the pixelated array of photosensitive elements 14 is very thin with a thickness of several microns. The pixelated array will generally not absorb a lot of x-rays, but absorption does occur and this can cause radiation damage to the photosensitive elements (i.e., photodiodes and transistors). Actually, the most damage happens because of the x-ray absorption taking place in the adjacent scintillator material and not by the direct absorption occurring in the photosensitive elements. The radiation damage that occurs because of the absorption in the scintillator material is due to the cloud of electrons that are generated at the top portion of the scintillator 16 where most of the x-rays absorption occurs. The cloud of electrons is the result of energy transferring from high energy electrons associated with the incoming x-rays to other electrons involved in the absorption process at the scintillator. Although the range of the cloud is relatively small, it will generally spread several microns into the pixelated array of photosensitive elements 14. Prolonged exposure to the electron clouds will likely lead to radiation damage of the pixelated array of photosensitive elements 14. For example, pixelated array of photosensitive elements that use amorphous silicon (a-Si) based field effect transistors may experience changes in their threshold voltage and leakage currents after prolonged exposure to radiation. Also, amorphous silicon (a-Si) based photosensitive nip diodes may experience an increase in their leakage current after radiation exposure. These changes may prevent the x-ray imager from working according to its specifications.

A solution for this possible problem is to place a substantially transparent thin film of material between the scintillator material 16 and the pixelated array of photosensitive elements 14 in order to absorb and substantially block the electrons from entering the active regions of the array. This thin film of material will prevent degradation of the electrical characteristics of the photosensitive elements and enable the imager to perform for a longer period of time according to its specifications. Below are more details of an imager with this architecture.

FIG. 5 is a schematic of a cross-sectional view of an x-ray imager 34 according to a second embodiment of the invention. The x-ray imager 34 is similar to the x-ray imager 20 shown in FIG. 2, except that the imager 34 comprises a substantially transparent material 40 disposed between the pixelated array of photosensitive elements 14 and the scintillator material 16. FIG. 5 shows that the pixelated array of photosensitive elements 14 has a first surface 36 and a second surface 38 opposite from the first surface. The substantially transparent material 40 is disposed between the first surface 28 of the scintillator material 16 and the second surface 30 of the pixelated array of photosensitive elements 14.

As mentioned above, the substantially transparent material 40 is a thin film of material. The substantially transparent material 40 shields or blocks electrons from entering the active regions of the pixelated array of photosensitive elements 14, which aids in preventing degradation of the electrical characteristics of the elements. In order to perform the functions described for this embodiment, the substantially transparent material 40 is substantially transparent to the incident x-ray flux. Generally, the substantially transparent material 40 has a low atomic number, i.e., Z less than or equal to 14, to prevent efficient x-ray absorption. In addition, the substantially transparent material 40 absorbs the electrons that are created from the x-ray absorption events occurring in the scintillator material 16, but is substantially transparent to the generated optical light. For mammography x-ray applications where the x-ray energy of interest is typically around 15 KeV to 20 KeV, the substantially transparent material 40 can have a thickness that ranges from about 2 microns to about 6 microns, depending on the density of the material. For vascular x-ray applications, where higher x-ray energies are used (e.g., approximately 30–80 KeV), the substantially transparent material 40 can have a thickness that ranges from about 1 micron to about 20 microns, depending on the density of the material.

In one embodiment, the substantially transparent material 40 is a silicon-based dielectric. The silicon-based dielectric can comprise silicon nitride (SiN) and silicon oxide (SiO). One of ordinary skill in the art will recognize that combinations of silicon nitride (SiN) and silicon oxide (SiO) are suitable for use as the substantially transparent material 40. For mammography x-ray applications, a silicon-based dielectric with a density near 2.3 g/cm$^3$ has a thickness that ranges from about 1 micron to about 5 microns. For vascular x-ray applications, this material has a thickness that ranges from about 2 microns to about 12 microns.

In another embodiment, the substantially transparent material 40 is a polymer material. The polymer material can comprise polyimide and para-xylylene. One of ordinary skill in the art will recognize that other polymers are suitable for use as the substantially transparent material 40. For mammography x-ray applications, a low density polymer has a thickness that ranges from about 1.5 microns to about 8 microns. For vascular x-ray applications, the polymer material has a thickness that ranges from about 3 microns to about 20 microns.

FIG. 6 is an alternative embodiment of the x-ray imager 34 shown in FIG. 5. In particular, FIG. 6 shows the x-ray imager 34 with a protective cover 32 disposed on the second surface 30 of the scintillator material 16. The protective cover 32 is the same (Tungsten or Tantalum) as the cover described for FIG. 3 and performs the same function (i.e., acts as a shield for the imager electronics and protects the scintillator from water, light and physical damage).

During operation of the x-ray imager 34, an x-ray flux is pulsed on and the x-rays passing through the subject undergoing examination are incident on the substantially x-ray transparent substrate 22. The x-rays travel through the substrate 22, pixelated array of photosensitive elements 14, substantially transparent material 40 to the scintillator material 16, which absorbs the x-rays. As mentioned above, most of the absorption occurs at the top portion of the scintillator 16. As the x-rays absorb into the scintillator material 16, a cloud of electrons are generated. The substantially transparent material 40 blocks or shields the electrons from impinging on and damaging the pixelated array of photosensitive elements by absorbing them. The cloud of electrons interacts further with the scintillator material 16 to produce light photons. Although FIGS. 5 and 6 show the photons propagating in an upward direction towards the pixelated array of photosensitive elements 14 and substantially x-ray transparent substrate 22, the photons emanate isotropically in all directions. In this embodiment, the light photons propagate through the substantially transparent material 40. The pixelated array of photosensitive elements 14 receives the light photons and measures the amount of light generated by the x-ray interactions with the scintillator material 16. Since the substantially transparent material 40 blocks or shields the electrons from impinging on and damaging the pixelated array of photosensitive elements by absorbing them, the imager 34 will perform for a longer period of time according to its specifications without degrading.

Figure 7:
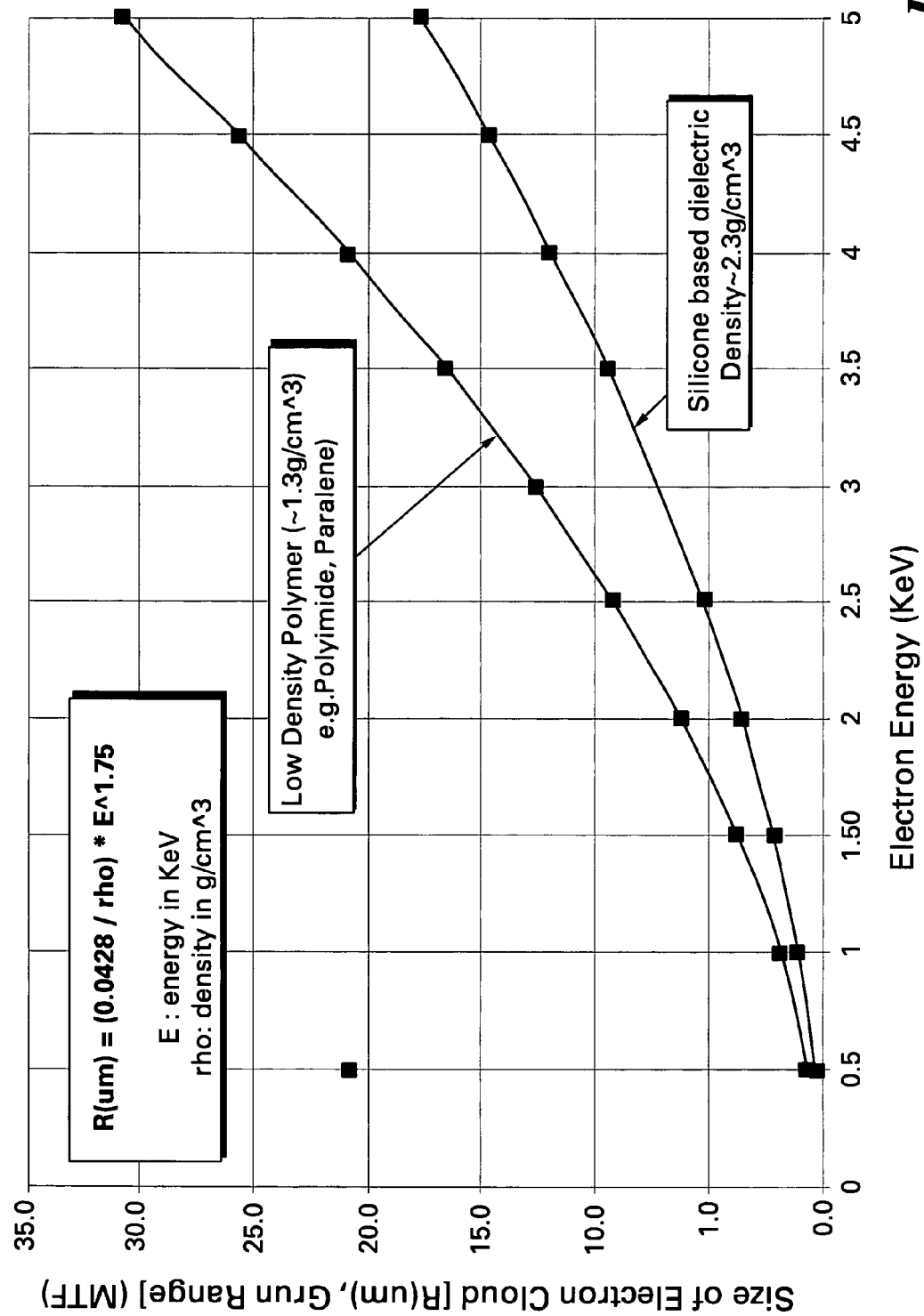
FIG. 7 is an illustration showing the approximate range of electrons in solid materials as a function of energy.

FIG. 7 is an illustration showing the approximate range that electrons can travel in solid materials as a function of energy. A simple analysis like the one done in FIG. 7 allows one to choose the required thickness of the substantially transparent material 40.

It is apparent that there has been provided in this invention an x-ray imager with back-side irradiation and an x-ray imager with a substantially transparent material that shields the pixelated array of photosensitive elements from damage. While the invention has been particularly shown and described in conjunction with preferred embodiments thereof, it will be appreciated that variations and modifications can be effected by a person of ordinary skill in the art without departing from the scope of the invention.

What is claimed is:

1. A solid-state radiation imager, comprising:
    a substantially radiation transparent substrate having a first surface and a second surface opposite from the first surface, wherein the first surface is adapted to receive incident radiation;
    a scintillator material having a first surface and a second surface opposite from the first surface;
    a pixelated array of photosensitive elements disposed between the substantially radiation transparent substrate and the scintillator material, wherein the pixelated array of photosensitive elements is disposed between the first surface of the scintillator material and the second surface of the substantially radiation transparent substrate; and
    a substantially transparent material disposed between the pixelated array of photosensitive elements and the scintillator material, wherein the substantially transparent material is disposed between the first surface of the scintillator material and the second surface of the pixelated array of photosensitive elements, and wherein the substantially transparent material has a thickness in a range from about 1 micron to about 20 microns.

2. The solid-state radiation imager according to claim 1, wherein the substantially transparent material comprises a silicon-based dielectric having a thickness from about 1 micron to about 12 microns.

3. The solid-state radiation imager according to claim 1, wherein the substantially transparent material comprises a polymer material having a thickness from about 1.5 microns to about 20 microns.

4. The solid-state radiation imager according to claim 1, wherein the substantially radiation transparent substrate comprises a glass material having a thickness that ranges from about 200 microns to about 700 microns.

5. The solid-state radiation imager according to claim 1, wherein the substantially radiation transparent substrate comprises a polymer material.

6. The solid-state radiation imager according to claim 5, wherein the polymer material comprises at least one of polyethylene terepthalate, polyimide, polyether sulfone, polycarbonate and polyetherimide.

7. The solid-state radiation imager according to claim 1, wherein the substantially radiation transparent substrate comprises aluminum oxide.

8. The solid-state radiation imager according to claim 1, wherein the substantially radiation transparent substrate has a transmission that is greater than about 80 percent.

9. The solid-state radiation imager according to claim 8, wherein the substantially radiation transparent substrate has a transmission that ranges from about 85 percent to about 95 percent.

10. The solid-state radiation imager according to claim 1, wherein the substantially radiation transparent substrate has a thickness that ranges from about 100 microns to about 5000 microns.

11. The solid-state radiation imager according to claim 1, further comprising a protective cover disposed on the second surface of the scintillator material.

12. The solid-state radiation imager according to claim 11, wherein the protective cover comprises a radiation opaque material.

13. The solid-state radiation imager according to claim 11, wherein the radiation opaque material comprises one of Tungsten and Tantalum.

14. An x-ray imager, comprising:
a substantially x-ray transparent substrate having a first surface and a second surface opposite from the first surface, wherein the first surface is adapted to receive incident x-rays;
a scintillator material having a first surface and a second surface opposite from the first surface, wherein the scintillator material is adapted to absorb the incident x-rays received by the substantially x-ray transparent substrate and generate light;
a pixelated array of photosensitive elements disposed between the substantially x-ray transparent substrate and the scintillator material, wherein the pixelated array of photosensitive elements is disposed between the first surface of the scintillator material and the second surface of the substantially x-ray transparent substrate, and wherein the pixelated array of photosensitive elements is adapted to determine the amount of x-ray energy received by each pixel in the array; and
a substantially transparent material disposed between the pixelated array of photosensitive elements and the scintillator material, wherein the substantially transparent material is disposed between the first surface of the scintillator material and the second surface of the pixelated array of photosensitive elements, and wherein the substantially transparent material has a thickness in a range from about 1 micron to about 20 microns.

15. The x-ray imager according to claim 14, wherein the substantially transparent material comprises a silicon-based dielectric having a thickness from about 1 micron to about 12 microns.

16. The x-ray imager according to claim 14, wherein the substantially transparent material comprises a polymer material having a thickness from about 1.5 microns to about 20 microns.

17. The x-ray imager according to claim 14, wherein the substantially x-ray transparent substrate comprises a polymer material comprising at least one of polyethylene terepthalate, polyimide, polyether sulfone, polycarbonate and polyetherimide.

18. The x-ray imager according to claim 14, wherein the substantially x-ray transparent substrate aluminum oxide.

19. The x-ray imager according to claim 14, wherein the substantially x-ray transparent substrate has an x-ray transmission that is greater than about 80 percent.

20. The x-ray imager according to claim 19, wherein the substantially x-ray transparent substrate has an x-ray transmission that ranges from about 85 percent to about 95 percent.

21. The x-ray imager according to claim 14, wherein the substantially x-ray transparent substrate has a thickness that ranges from about 100 microns to about 5000 microns.

22. The x-ray imager according to claim 14, further comprising a protective cover disposed on the second surface of the scintillator material, wherein the protective cover is adapted to protect the scintillator material.

23. The x-ray imager according to claim 22, wherein the protective cover comprises an x-ray opaque material comprising at least one of Tungsten and Tantalum.

24. A solid-state radiation imager, comprising:
a substantially radiation transparent substrate having a first surface and a second surface opposite from the first surface, wherein the first surface is adapted to receive incident radiation;
a scintillator material having a first surface and a second surface opposite from the first surface;
a pixelated array of photosensitive elements disposed between the substantially radiation transparent substrate the scintillator material, wherein the pixelated array of photosensitive elements is disposed between the first surface of the scintillator material and the second surface of the substantially radiation transparent substrate;
a substantially transparent material disposed between the pixelated array of photosensitive elements and the scintillator material, wherein the substantially transparent material is disposed between the first surface of the scintillator material and the second surface of the pixelated array of photosensitive elements, and wherein the substantially transparent material has a thickness in a range from about 1 micron to about 20 microns; and
a protective cover disposed on the second surface the scintillator material.

25. The solid-state radiation imager according to claim 24, wherein the substantially radiation transparent substrate at least one of a glass material, a polymer material and aluminum oxide.

26. The solid-state radiation imager according to claim 24, wherein the substantially radiation transparent substrate has a transmission that is greater than about 80 percent.

27. The solid-state radiation imager according to claim 26, wherein the substantially radiation transparent substrate has a transmission that ranges from about 85 percent to about 95 percent.

28. The solid-state radiation imager according to claim 24, wherein the substantially radiation transparent substrate has a thickness that ranges from about 100 microns to about 5000 microns.

29. A solid-state radiation imager, comprising:
a substantially radiation transparent substrate having a first surface and a second surface opposite from the first surface, wherein the first surface is adapted to receive incident radiation;
a scintillator material having a first surface and a second surface opposite from the first surface;
a pixelated array of photosensitive elements having a first surface and a second surface opposite from the first surface, disposed between the substantially radiation transparent substrate and the scintillator material, wherein the first surface of the pixelated array of photosensitive elements is disposed on the second surface of the substantially radiation transparent substrate; and
a substantially transparent material disposed between the pixelated array of photosensitive elements and the scintillator material, wherein the substantially transparent material is disposed between the first surface of the scintillator material and the second surface of the pixelated array of photosensitive elements, and wherein the substantially transparent material has a thickness in a range from about 1 micron to about 20 microns.

30. The solid-state radiation imager according to claim 29, wherein the substantially transparent material comprises a silicon-based dielectric.

31. The solid-state radiation imager according to claim 30, wherein the silicon-based dielectric comprises at least one of silicon nitride and silicon oxide.

32. The solid-state radiation imager according to claim 30, wherein the silicon-based dielectric has a thickness that ranges from about 1 micron to about 5 microns.

33. The solid-state radiation imager according to claim 30, wherein the silicon-based dielectric has a thickness that ranges from about 2 microns to about 12 microns.

34. The solid-state radiation imager according to claim 29, wherein the substantially transparent material comprises a polymer material.

35. The solid-state radiation imager according to claim 34, wherein the polymer material comprises at least one of polyimide and para-xylylene.

36. The solid-state radiation imager according to claim 34, wherein the polymer material has a thickness that ranges from about 1.5 microns to about 8 microns.

37. The solid-state radiation imager according to claim 34, wherein the polymer material has a thickness that ranges from about 3 microns to about 20 microns.

38. The solid-state radiation imager according to claim 29, wherein the substantially transparent material has an atomic number that is less than or equal to 14.

39. An x-ray imager comprising:
a substantially x-ray transparent substrate having a first surface and a second surface opposite from the first surface, wherein the first surface is adapted to receive incident x-rays;
a scintillator material having a first surface and a second surface opposite from the first surface, wherein the scintillator material is adapted to absorb the incident x-rays received by the substantially x-ray transparent substrate and generate light;
a pixelated array of photosensitive elements having a first surface and a second surface opposite from the first surface, disposed between the substantially x-ray transparent substrate and the scintillator material, wherein the first surface of the pixelated array of photosensitive elements is disposed on the second surface of the substantially x-ray transparent substrate, and wherein the pixelated array of photosensitive elements is adapted to determine the amount of x-ray energy received by each pixel in the array; and
a substantially transparent material disposed between the pixelated array of photosensitive elements and the scintillator material, wherein the substantially transparent material is disposed between the first surface of the scintillator material and the second surface of the pixelated array of photosensitive elements, and wherein the substantially transparent material is adapted to shield the pixelated array of photosensitive elements from electrons generated in the scintillator material, and wherein the substantially transparent material has a thickness in a range from about 1 micron to about 20 microns.

40. The x-ray imager according to claim 39, wherein the substantially transparent material comprises a silicon-based dielectric.

41. The x-ray imager according to claim 40, wherein the silicon-based dielectric comprises at least one of silicon nitride and silicon oxide.

42. The x-ray imager according to claim 40, wherein the silicon-based dielectric has a thickness that ranges from about 1 micron to about 5 microns.

43. The x-ray imager according to claim 40, wherein the silicon-based dielectric has a thickness that ranges from about 2 microns to about 12 microns.

44. The x-ray imager according to claim 39, wherein the substantially transparent material comprises a polymer material.

45. The x-ray imager according to claim 44, wherein the polymer material comprises at least one of polyimide and para-xylylene.

46. The x-ray imager according to claim 44, wherein the polymer material has a thickness that ranges from about 1.5 microns to about 8 microns.

47. The x-ray imager according to claim 44, wherein the polymer material has a thickness that ranges from about 3 microns to about 20 microns.

48. The x-ray imager according to claim 39, wherein the substantially transparent material has an atomic number that is less than or equal to 14.

49. A solid-state radiation imager, comprising:
a substantially radiation transparent substrate having a first surface and a second surface opposite from the first surface, wherein the first surface is adapted to receive incident radiation;
a scintillator material having a first surface and a second surface opposite from the first surface;
a pixelated array of photosensitive elements having a first surface and a second surface opposite from the first surface, disposed between the substantially radiation transparent substrate and the scintillator material, wherein the first surface of the pixelated array of photosensitive elements is disposed on the second surface of the substantially radiation transparent substrate;
a substantially transparent material disposed between the pixelated array of photosensitive elements and the scintillator material, wherein the substantially transparent material is disposed between the first surface of the scintillator material and the second surface of the pixelated array of photosensitive elements, and wherein the substantially transparent material has a thickness in a range from about 1 micron to about 20 microns; and
a protective cover disposed on the second surface of the scintillator material.

50. The solid-state imager according to claim 49, wherein the substantially transparent material comprises a silicon-based dielectric.

51. The solid-state imager according to claim 50, wherein the silicon-based dielectric comprises at least one of silicon nitride and silicon oxide.

52. The solid-state imager according to claim 50, wherein the silicon-based dielectric has a thickness that ranges from about 1 micron to about 5 microns.

53. The solid-state imager according to claim 50, wherein the silicon-based dielectric has a thickness that ranges from about 2 microns to about 12 microns.

54. The solid-state imager according to claim 49, wherein the substantially transparent material comprises a polymer material.

55. The solid-state imager according to claim 54, wherein the polymer material comprises at least one of polyimide and para-xylylene.

56. The solid-state imager according to claim 54, wherein the polymer material has a thickness that ranges from about 1.5 microns to about 8 microns.

57. The solid-state imager according to claim 54, wherein the polymer material has a thickness that ranges from about 3 microns to about 20 microns.

58. The solid-state imager according to claim 49, wherein the substantially transparent material has an atomic number that is less than or equal to 14.

* * * * *